US010684459B2

(12) United States Patent
Ito et al.

(10) Patent No.: US 10,684,459 B2
(45) Date of Patent: *Jun. 16, 2020

(54) LIGHT OBSERVATION DEVICE, IMAGING DEVICE USED FOR SAME, AND LIGHT OBSERVATION METHOD

(71) Applicant: HAMAMATSU PHOTONICS K.K., Hamamatsu-shi, Shizuoka (JP)

(72) Inventors: Katsuhide Ito, Hamamatsu (JP); Takayuki Inoue, Hamamatsu (JP); Takuo Kameyama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,144

(22) Filed: May 8, 2018

(65) Prior Publication Data
US 2018/0329195 A1 Nov. 15, 2018

Related U.S. Application Data

(63) Continuation of application No. 14/895,078, filed as application No. PCT/JP2014/053533 on Feb. 14, 2014, now Pat. No. 9,995,920.

(30) Foreign Application Priority Data

Jun. 3, 2013 (JP) ................. 2013-116917

(51) Int. Cl.
*G02B 21/36* (2006.01)
*H04N 5/378* (2011.01)
(Continued)

(52) U.S. Cl.
CPC ............. *G02B 21/36* (2013.01); *G02B 21/18* (2013.01); *G02B 21/367* (2013.01);
(Continued)

(58) Field of Classification Search
None
See application file for complete search history.

(56) References Cited

U.S. PATENT DOCUMENTS 5,926,283 A * 7/1999 Hopkins ............... G01J 3/2823
250/226
6,115,065 A * 9/2000 Yadid-Pecht .......... H04N 5/235
348/308

(Continued)

FOREIGN PATENT DOCUMENTS

EP    1 615 009 A1    1/2006
JP    2001-525534 A    12/2001
(Continued)

OTHER PUBLICATIONS

K. Kinosita, Jr. et al., "Dual-View Microscopy with a Single Camera: Real Time Imaging of Molecular Orientations and Calcium", The Journal of Cell Biology, vol. 115, No. 1, Oct. 1991, p. 67-p. 73.

(Continued)

*Primary Examiner* — Hung Q Dang
(74) *Attorney, Agent, or Firm* — Faegre Drinker Biddle & Reath LLP

(57) ABSTRACT

A light observation device has a light splitting optical system for splitting observation light of an observation object; an imaging lens for focusing split beams to form optical images thereof; an imaging device arranged at image formation positions of the two optical images and being capable of performing independent rolling readout in a pixel row group included in a region corresponding to the image formation position of one optical image and in a pixel row group included in a region corresponding to the image formation position of the other optical image; and a control unit for independently controlling the rolling readout in the one pixel row group and in the other pixel row group; the control unit (Continued)

performs control such that a direction of the rolling readout in the one pixel row group and a direction of the rolling readout in the other pixel row group are identical.

5 Claims, 14 Drawing Sheets

(51) Int. Cl.
H04N 5/353 (2011.01)
H04N 5/232 (2006.01)
H04N 5/225 (2006.01)
G02B 21/18 (2006.01)

(52) U.S. Cl.
CPC ....... *H04N 5/2254* (2013.01); *H04N 5/23245* (2013.01); *H04N 5/3532* (2013.01); *H04N 5/378* (2013.01)

(56) References Cited

U.S. PATENT DOCUMENTS

| | | | |
|---|---|---|---|
| 6,689,998 B1* | 2/2004 | Bremer | G02B 7/28 235/462.23 |
| 7,667,761 B2 | 2/2010 | Thomas | |
| 2009/0073274 A1* | 3/2009 | Dai | H04N 5/235 348/222.1 |
| 2010/0097510 A1 | 4/2010 | Wada et al. | |
| 2012/0098997 A1* | 4/2012 | Joboji | H04B 10/11 348/226.1 |
| 2012/0218426 A1* | 8/2012 | Kaizu | H04N 5/35554 348/208.4 |
| 2013/0329128 A1* | 12/2013 | Kaizu | H04N 5/374 348/367 |
| 2014/0211061 A1* | 7/2014 | Nomiyama | H04N 5/3575 348/312 |
| 2014/0320719 A1* | 10/2014 | Tsuji | H04N 5/37457 348/308 |
| 2014/0332668 A1 | 11/2014 | Nishihara et al. | |

FOREIGN PATENT DOCUMENTS

| | | |
|---|---|---|
| JP | 2002-135795 A | 5/2002 |
| JP | 2006-270292 A | 10/2006 |
| JP | 2008-103992 A | 5/2008 |
| JP | 2010-098516 A | 4/2010 |
| WO | WO-99/002950 A1 | 1/1999 |

OTHER PUBLICATIONS

International Preliminary Report on Patentability dated Dec. 17, 2015 for PCT/JP2014/053533.

* cited by examiner

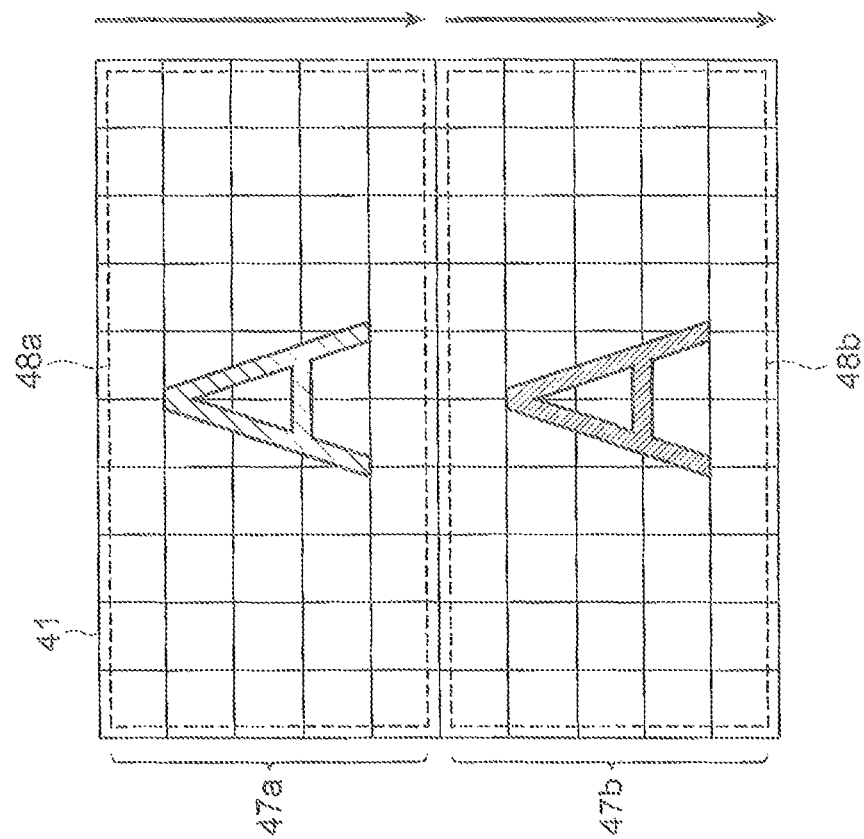

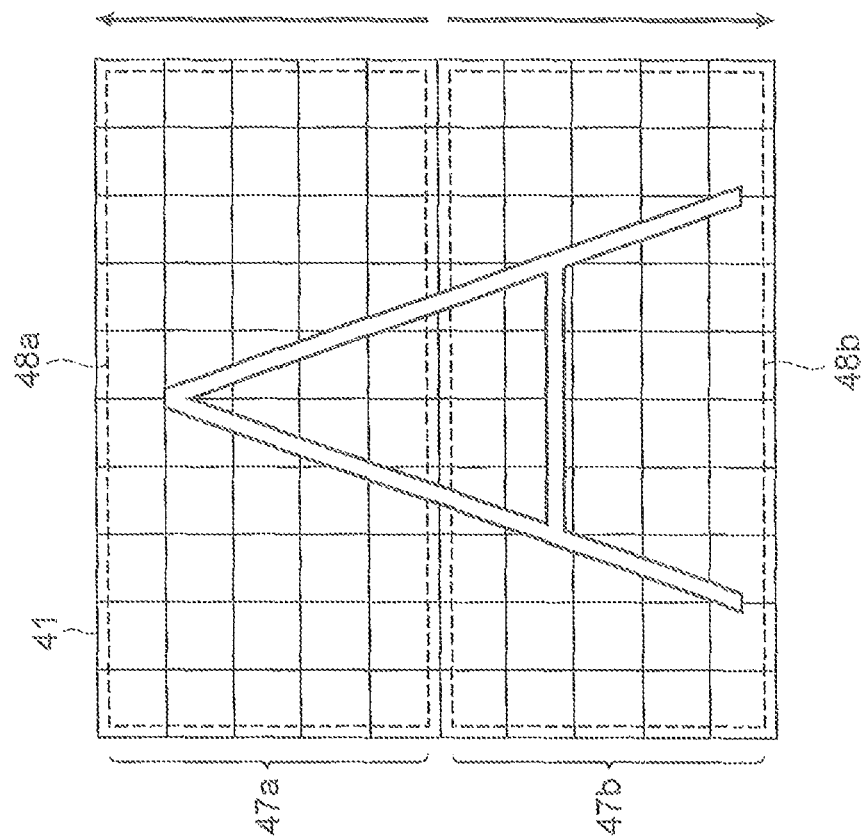

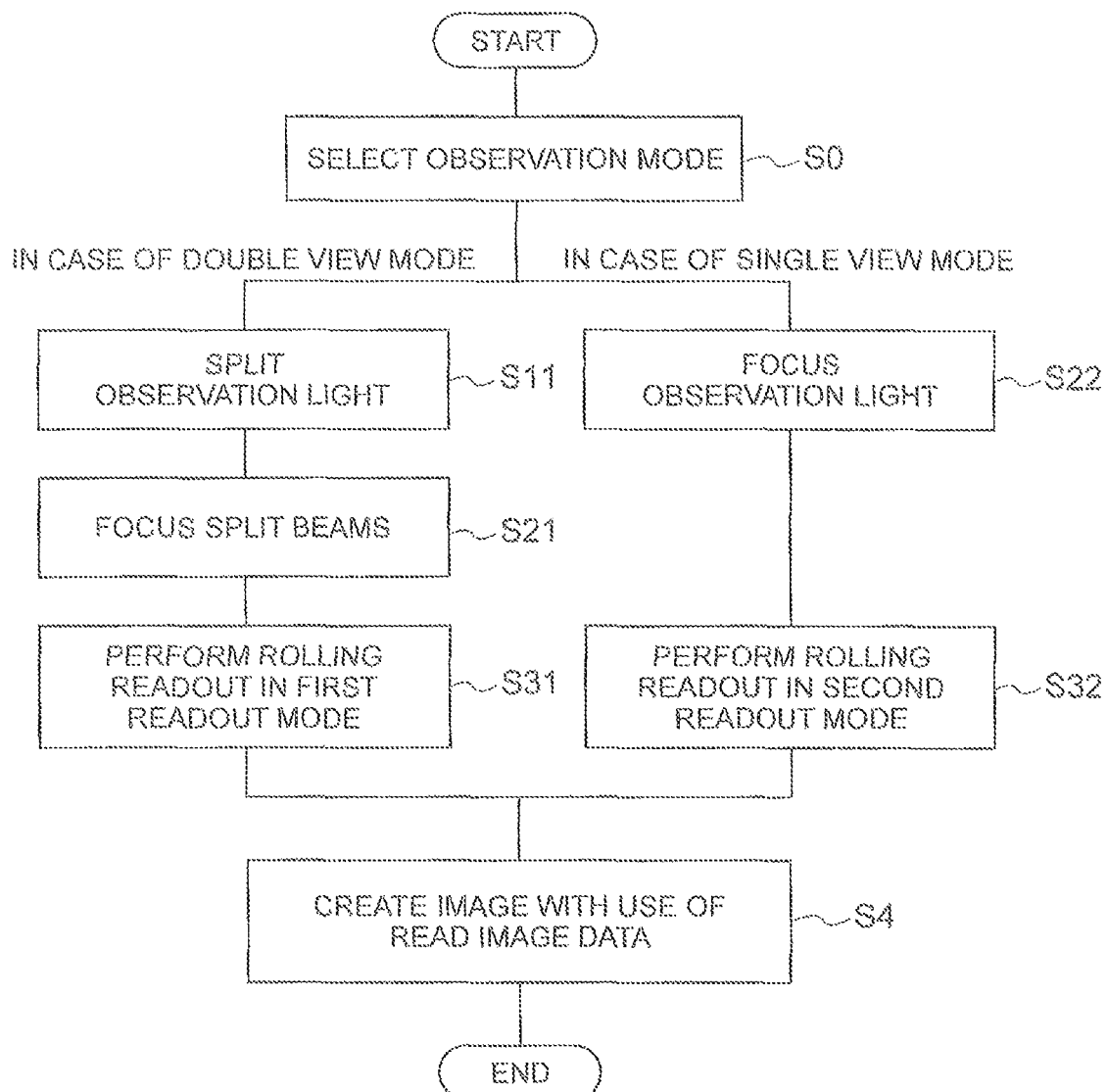

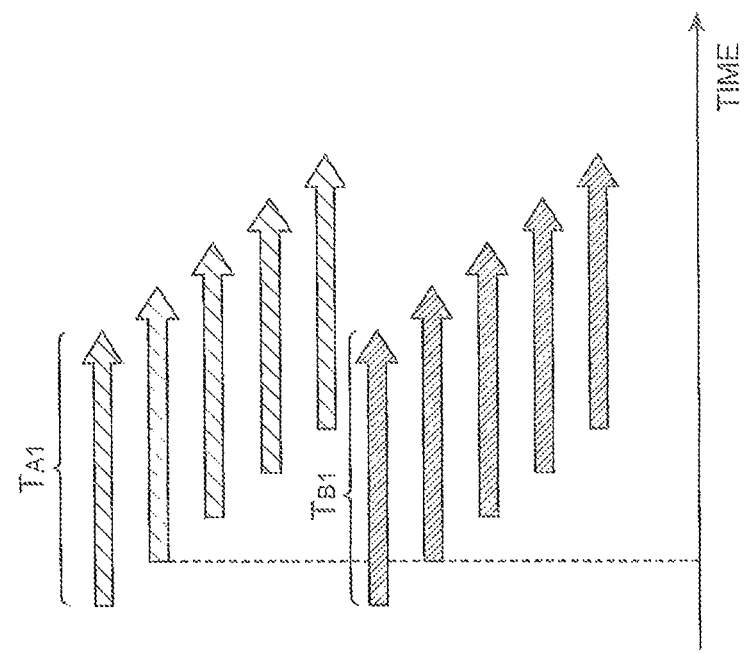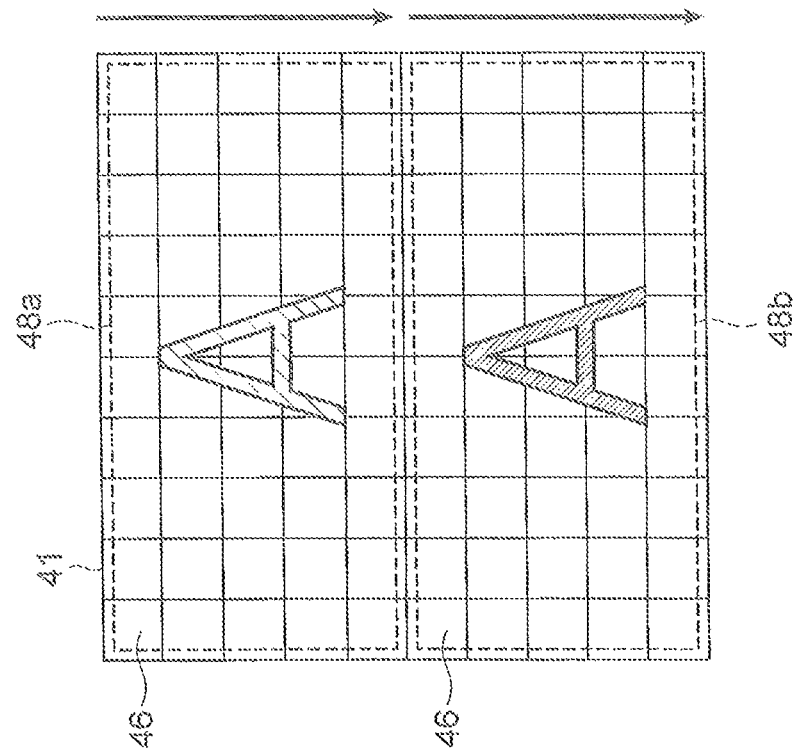

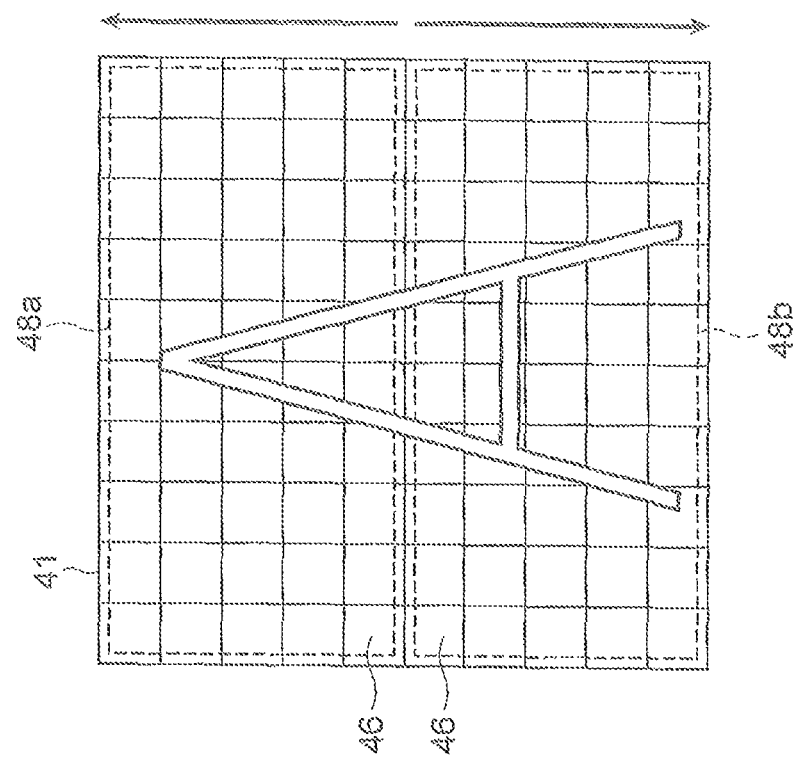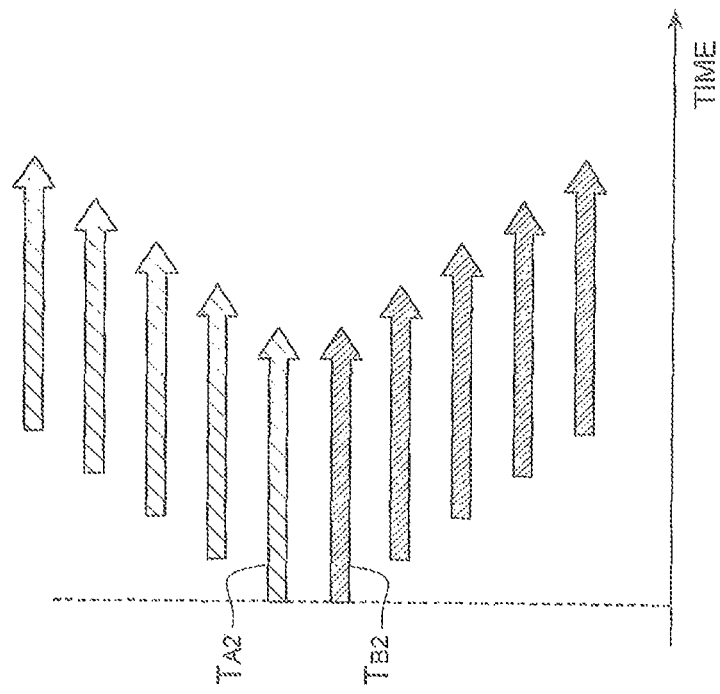

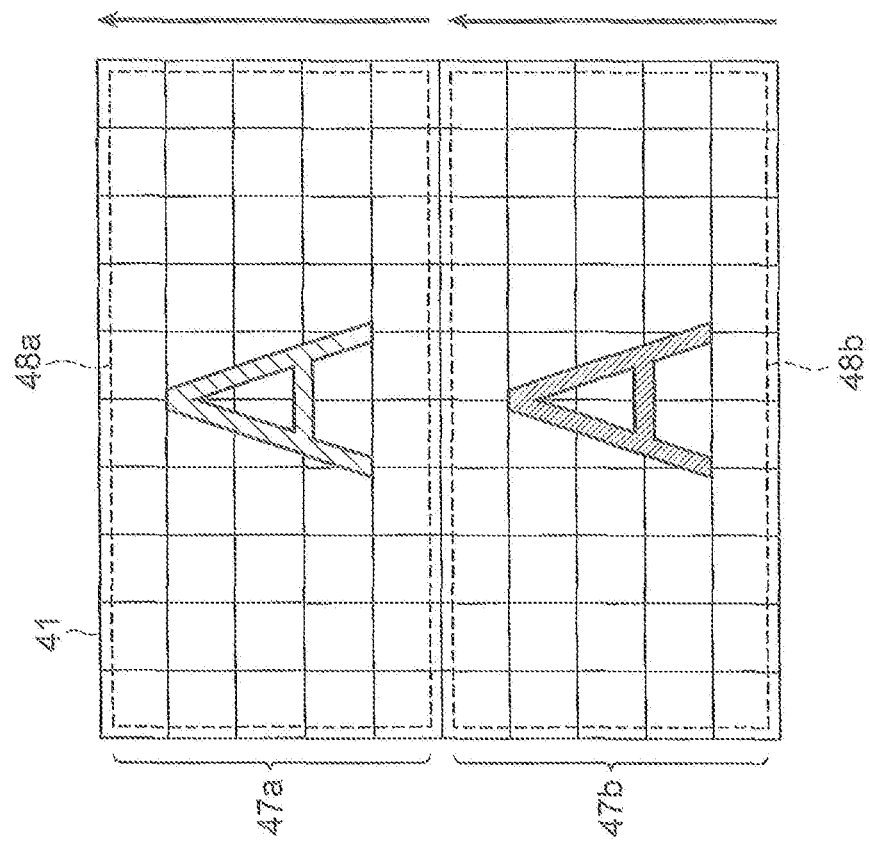

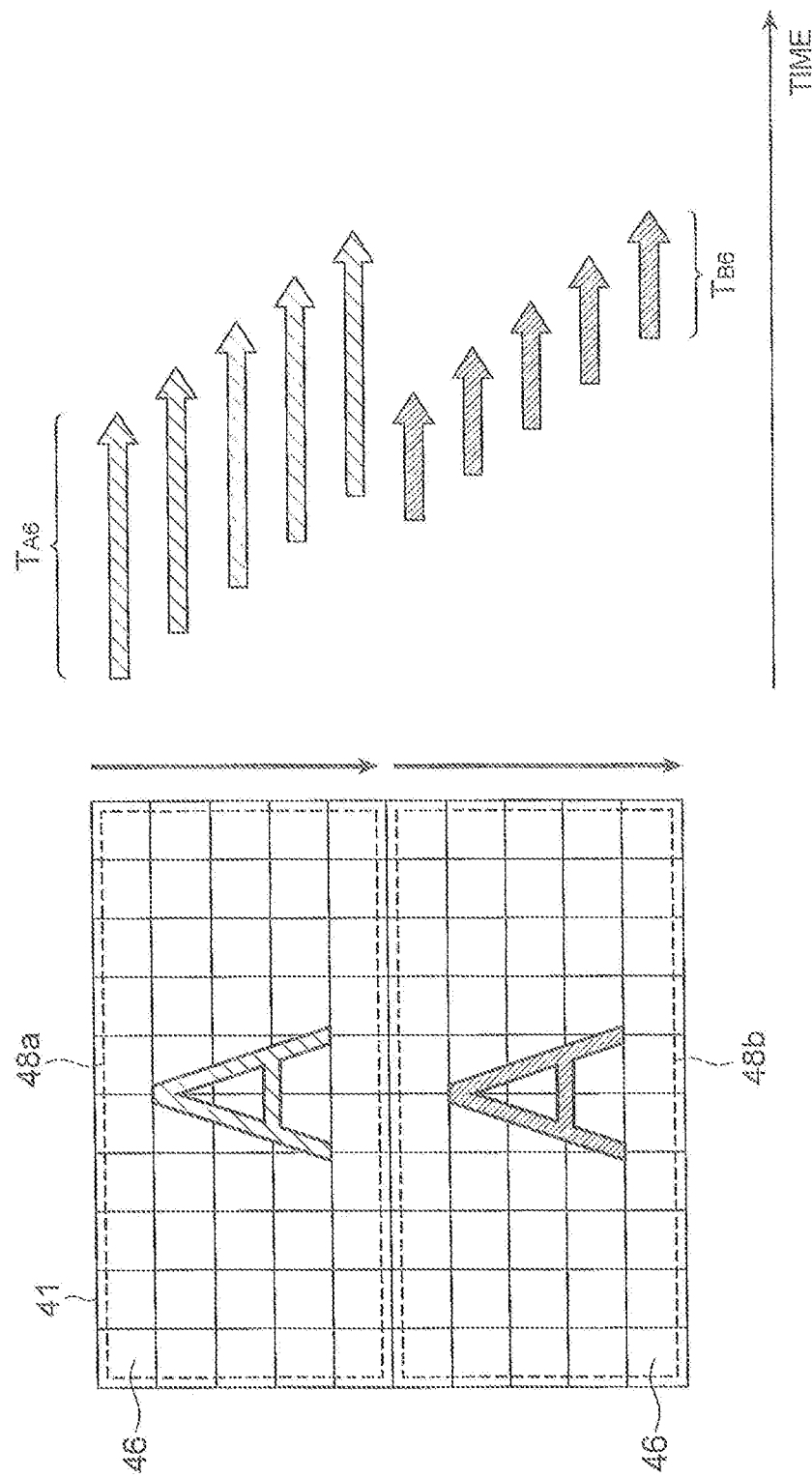

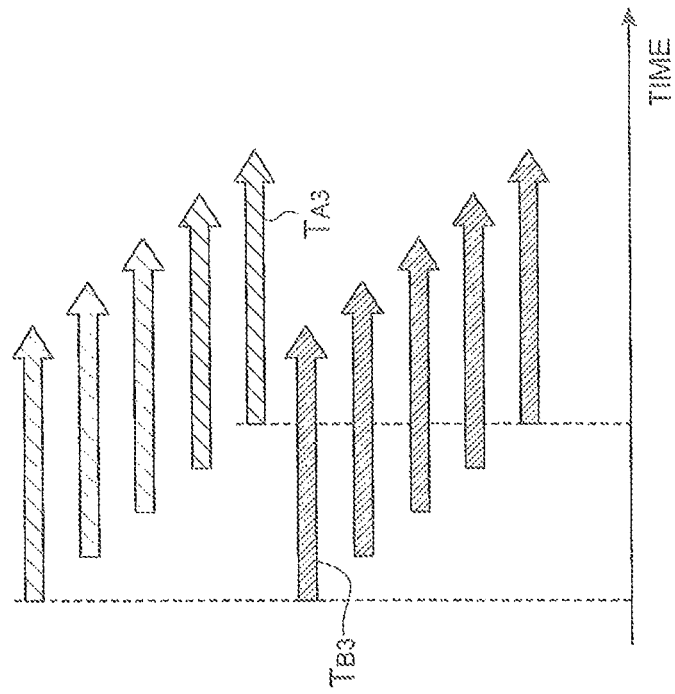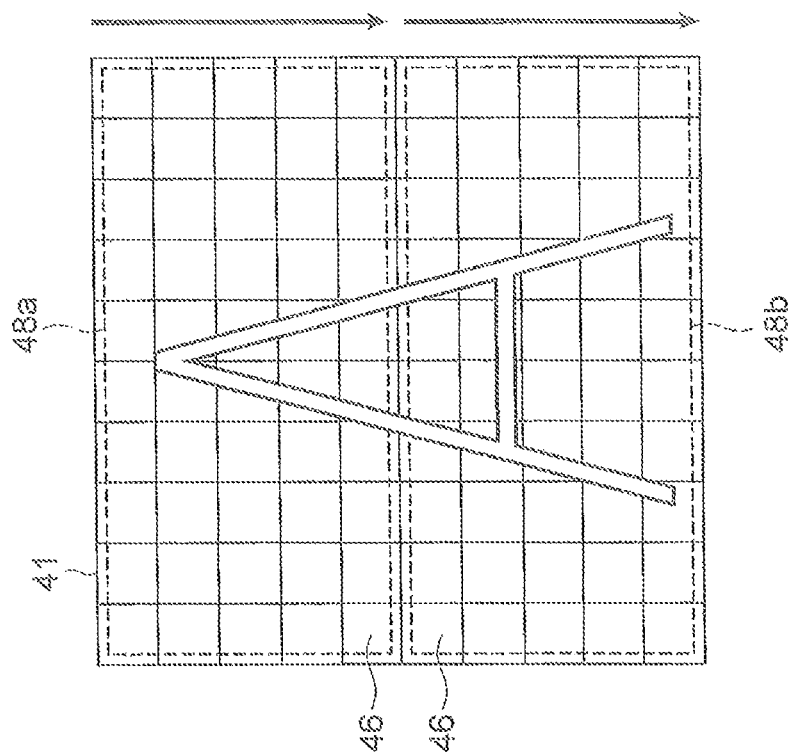

LIGHT OBSERVATION DEVICE, IMAGING DEVICE USED FOR SAME, AND LIGHT OBSERVATION METHOD

This is a continuation application of copending application Ser. No. 14/895,078, having a § 371 date of Dec. 1, 2015, which is a national stage filing based on PCT International Application No. PCT/JP2014/053533, filed on Feb. 14, 2014. The copending application Ser. No. 14/895,078 is incorporated by reference herein in its entirety.

TECHNICAL FIELD

The present invention relates to a light observation device for observing an optical image of an object, an imaging device used for the same, and a light observation method.

BACKGROUND ART

In the technical field of life science or the like, it is common practice to disperse observation light (e.g., fluorescence or the like) from a specimen according to wavelengths and observe a plurality of optical images resulting from the dispersion. For example, Non Patent Literature 1 below discloses the dual view microscopy technique with a single camera, and describes this technique such that the observation light is dispersed by means of a light splitting assembly attached outside a microscope main body and that two observation beams resulting from the dispersion can be imaged with use of the camera. Patent Literature 1 and Patent Literature 2 below disclose the light splitting optical systems to be used in the dual view inspection technique.

CITATION LIST

Patent Literatures

Patent Literature 1: U.S. Pat. No. 5,926,283
Patent Literature 2: U.S. Pat. No. 7,667,761

Non Patent Literature

Non Patent Literature 1: K. Kinosita, Jr. et al., "Dual View Microscopy with a Single Camera: Real-Time Imaging of Molecular Orientations and Calcium," The Journal of Cell Biology, Volume 115, Number 1, October 1991, pp 67-73

SUMMARY OF INVENTION

Technical Problem

However, since the foregoing conventional microscopy technique is to observe two types of optical images with the single camera, when the camera was one adopting the rolling readout method, such as a CMOS camera, imaging timings at a specific part in the two types of optical images might be different from each other. As a result, comparative observation tended to be difficult between the two types of optical images from an object of a specimen.

Therefore, the present invention has been accomplished in view of the above-described problem and it is an object of the present invention to provide a light observation device which facilitates the comparative observation between two types of optical images from an object even in the case adopting the rolling readout method, an imaging device used for the same, and a light observation method.

Solution to Problem

In order to solve the above problem, a light observation device according to one embodiment of the present invention comprises: a light splitting optical system configured to receive observation light of an object from the outside and split the observation light into first and second beams; an imaging lens configured to receive the first and second beams and focus the first and second beams to form first and second optical images; an imaging element which is arranged at image formation positions of the first and second optical images, which is configured with a plurality of pixel rows including a plurality of pixels and being arranged in juxtaposition, and which can perform independent rolling readout in a first pixel row group among a plurality of pixel rows included in a first region corresponding to the image formation position of the first optical image and in a second pixel row group among a plurality of pixel rows included in a second region corresponding to the image formation position of the second optical image; and a control unit configured to control the rolling readout in the first pixel row group included in the first region and in the second pixel row group included in the second region, wherein the control unit performs control such that a direction of the rolling readout in the first pixel row group and a direction of the rolling readout in the second pixel row group are identical in a juxtaposition direction of the plurality of pixel rows.

As another aspect, a light observation method of another embodiment of the present invention is a light observation method using an imaging device which has a first pixel row group configured with a plurality of pixel rows including a plurality of pixels and being arranged in juxtaposition, and a second pixel row group adjoining the first pixel row group and configured with a plurality of pixel rows including a plurality of pixels and being arranged in juxtaposition and which can perform rolling readout in each of the first pixel row group and the second pixel row group, the light observation method comprising: splitting observation light of an object from the outside into first and second beams; focusing the first beam to form a first optical image so as to impinge on the first pixel row group; focusing the second beam to form a second optical image so as to impinge on the second pixel row group; and performing control such that a direction of the rolling readout in the first pixel row group and a direction of the rolling readout in the second pixel row group are identical in a juxtaposition direction of the plurality of pixel rows.

According to the light observation device and light observation method as described above, the observation light of the object is split into the first and second beams, the split first and second beams are focused to form the first and second optical images, the first optical image is received by the first pixel row group included in the first region of the imaging element, and the second optical image is received by the second pixel row group included in the second region of the imaging element. Then, detection signals of the first and second optical images are read out by the independent rolling readout from the first and second pixel row groups, respectively, while the direction of the rolling readout in the first pixel row group and the direction of the rolling readout in the second pixel row group are made identical. This makes it easier to match exposure timings at the same part of the object between a detected image of the first optical image and a detected image of the second optical image and thus allows exposure conditions for each part of the two optical images to be made uniform. As a result, it can facilitate the comparative observation using the detected images of the two optical images.

Furthermore, an imaging device according to one embodiment of the present invention is an imaging device to be used for a light observation device which splits observation light of an object from the outside into first and second beams and which simultaneously captures first and second optical images generated based on the first and second beams, the imaging device comprising: a first pixel row group configured with a plurality of pixel rows including a plurality of pixels and being arranged in juxtaposition; a second pixel row group adjoining the first pixel row group and configured with a plurality of pixel rows including a plurality of pixels and being arranged in juxtaposition; a first signal readout circuit for processing signal readout from the first pixel row group; and a second signal readout circuit for processing signal readout from the second pixel row group, independently of the first signal readout circuit, wherein the first signal readout circuit processes the signal readout in the first pixel row group by rolling readout and sets a direction of the rolling readout to one direction in a juxtaposition direction of the plurality of pixel rows, and wherein the second signal readout circuit processes the signal readout in the second pixel row group by rolling readout and sets a direction of the rolling readout to the one direction in the juxtaposition direction of the plurality of pixel rows.

According to the imaging device as described above, the first optical image formed based on the first beam split off from the observation light of the object is allowed to be received by the first pixel row group included in the first region of the imaging device. At the same time as it, the second optical image formed based on the second beam split off from the observation light of the object is allowed to be received by the second pixel row group included in the second region of the imaging device. Then, detection signals of the first and second optical images are read out by the independent rolling readout from the first and second pixel row groups by the first and second signal readout circuits, respectively, while the direction of the rolling readout in the first pixel row group and the direction of the rolling readout in the second pixel rows are made identical. This makes it easier to match exposure timings at the same part of the object between a detected image of the first optical image and a detected image of the second optical image and thus allows the exposure conditions for each part of the two optical images to be made uniform. As a result, it can facilitate the comparative observation using the detected images of the two optical images.

Advantageous Effects of Invention

According to the present invention, the comparative observation between the two types of optical images of the object is facilitated even in the case adopting the rolling readout method.

BRIEF DESCRIPTION OF DRAWINGS

FIG. 4 is a drawing conceptually showing directions of rolling readout in pixel row groups 47a, 47b on a light receiving surface 41 controlled by a control unit 9 in FIG. 1.

FIG. 5 is a drawing conceptually showing directions of rolling readout in the pixel row groups 47a, 47b on the light receiving surface 41 controlled by the control unit 9 in FIG. 1.

FIG. 6 is a flowchart showing a procedure of a light observation method according to the embodiment of the present invention.

FIG. 7A is a drawing conceptually showing directions of rolling readout on the light receiving surface 41 controlled by the control unit 9 in use in a double view mode, and FIG. 7B a drawing showing exposure timings in respective pixel rows 46 on the light receiving surface 41 corresponding to the foregoing control.

FIG. 8A is a drawing conceptually showing directions of rolling readout on the light receiving surface 41 controlled by the control unit 9 in use in a single view mode, and FIG. 8B a drawing showing exposure timings in the respective pixel rows 46 on the light receiving surface 41 corresponding to the foregoing control.

FIG. 9 is a drawing conceptually showing directions of rolling readout in the pixel row groups 47a, 47b on the light receiving surface 41 controlled by the control unit 9 according to a modification example of the present invention.

FIG. 11A is a drawing conceptually showing directions of rolling readout on the light receiving surface 41 in a modification example of the present invention, and FIG. 11B a drawing showing exposure timings in the respective pixel rows 46 on the light receiving surface 41 corresponding to the foregoing control.

FIG. 12A is a drawing conceptually showing directions of rolling readout on the light receiving surface 41 in a comparative example, and FIG. 12B a drawing showing exposure timings in the respective pixel rows 46 on the light receiving surface 41 corresponding to the foregoing control.

DESCRIPTION OF EMBODIMENTS

Figure 1:
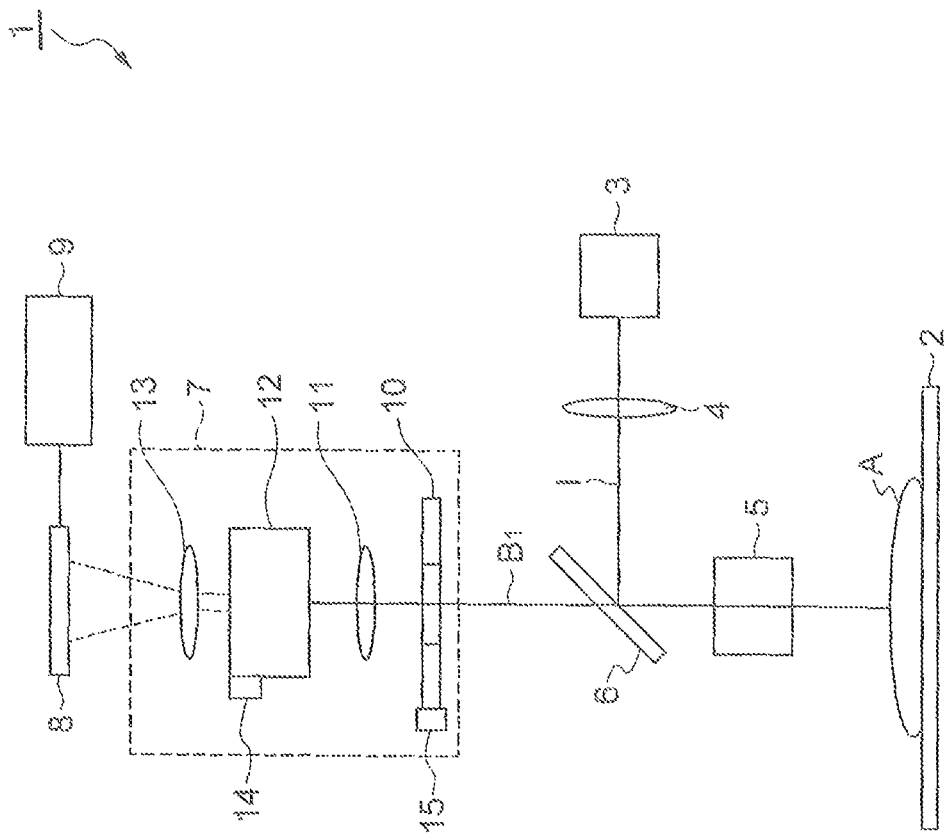
FIG. 1 is a schematic configuration diagram of a light observation device 1 according to one embodiment of the present invention.

Embodiments of the light observation device and the imaging device used for the same according to the present invention will be described below in detail with reference to the accompanying drawings. In the description of the drawings the same elements will be denoted by the same reference signs, without redundant description. It should be noted that each drawing was prepared for description's sake and is depicted with particular emphasis on a target part of description. For this reason, dimensional ratios of respective members in the drawings do not always coincide with actual ones.

FIG. 1 is a schematic configuration diagram of the light observation device 1 according to one embodiment of the present invention. The light observation device 1 according to the present embodiment is a device that splits observation light of an observation object A into wavelength components and that captures and outputs optical images of the split two wavelength components. As shown in the same figure, the light observation device 1 is configured including: a stage 2 on which the observation object A is to be mounted; a light source 3 which emits illumination light I to be applied onto the observation object A; a collimator lens 4 which condenses the illumination light I emitted from the light source 3; an objective lens 5 which condenses observation light $B_1$ such as fluorescence or reflection generated from the observation object A in accordance with the application with the illumination light I; a beam splitter 6 which reflects the illumination light I from the light source 3 toward the observation object A on the stage 2 and which transmits the observation light $B_1$ from the observation object A; a light splitting optical device 7 which splits the observation light $B_1$ into two beams and which outputs two optical images; an imaging device (imaging element) 8 which is arranged at image formation positions of the two optical images split by the light splitting optical device 7; and a control unit 9 which controls the operation of the imaging device 8. This light splitting optical device 7 is internally equipped with an aperture stop 10, a collimator lens 11, a light splitting optical system 12, and an imaging lens 13.

Figure 2:
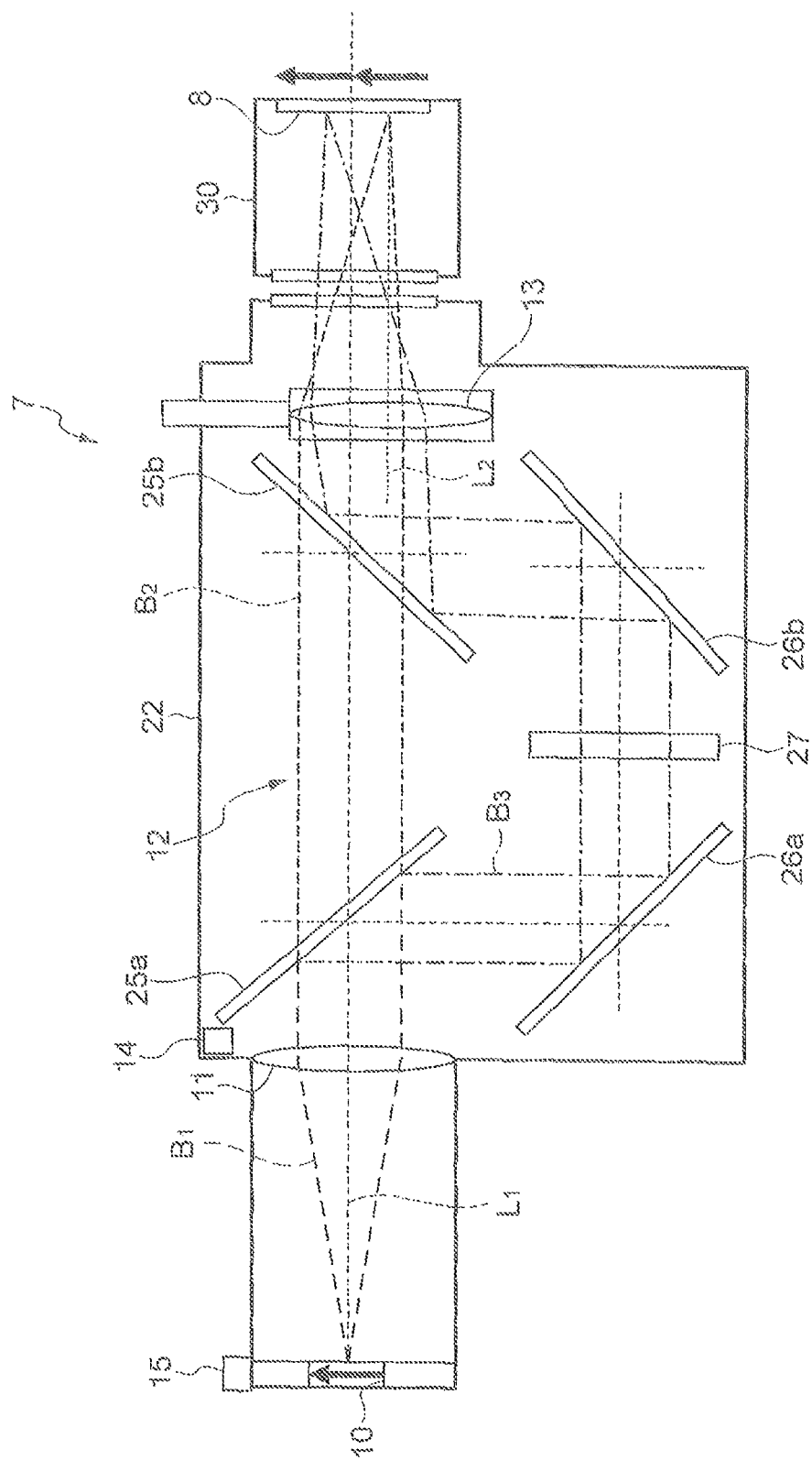
FIG. 2 is a perspective view showing an example of a configuration of a light splitting optical device 7 in FIG. 1.

FIG. 2 is a perspective view showing an example of the configuration of the light splitting optical device 7. As shown in the same figure, the light splitting optical device 7 is configured as internally equipped with the collimator lens 11, the imaging lens 13, and the light splitting optical system 12 including a front dichroic mirror 25a, a rear dichroic mirror 25b, a front mirror 26a, a rear mirror 26b, and a correction lens 27, in a housing 22. Furthermore, an aperture stop 10 with a circular aperture is provided in an end face at one end side of the housing 22. This aperture stop 10 has a stop adjusting mechanism 15 capable of variably setting the inside diameter of its aperture. The below will describe configurations of the respective constituent elements of the light splitting optical device 7.

This light splitting optical device 7 is arranged so that the observation light $B_1$ having passed through the beam splitter 6 can enter the inside through the aperture stop 10. The observation light $B_1$ having passed through the aperture stop 10 is then converted into parallel light by the collimator lens 11 and the resultant parallel light is output along the optical axis $L_1$ of the collimator lens 11.

The front dichroic mirror 25a and the rear dichroic mirror 25b are arranged so as to be detachable from on the optical axis $L_1$ inside the housing 22. Namely, these dichroic mirrors 25a, 25b are integrally configured so as to be detachable from on the optical path of the observation light $B_1$ inside the housing 22. The dichroic mirrors 25a, 25b may also be integrated with the below-described front mirror 26a, rear mirror 26b, and correction lens 27 so as to be detachable together. This front dichroic mirror 25a disperses the parallel light output from the collimator lens 11 and transmits a first split beam $B_2$ dispersed, into a direction along the optical axis $L_1$. At the same time, the front dichroic mirror 25a disperses the parallel light and reflects a second split beam 13 dispersed, into a direction perpendicular to the optical axis $L_1$.

The rear dichroic mirror 25b further transmits the first split beam $B_2$ having transmitted by the front dichroic mirror 25a, thereby to output the first split beam $B_2$ toward the imaging lens 13 arranged at the other end side of the housing 22. At the same time, the rear dichroic mirror 25b reflects the second split beam $B_3$, which has traveled via the front mirror 26a, correction lens 27, and rear mirror 26b after having been reflected by the front dichroic mirror 25a, to output the second split beam $B_3$ toward the imaging lens 13.

The front mirror 26a reflects the second split beam $B_3$ output from the front dichroic mirror 25a, into a direction parallel to the optical axis $L_1$. The rear mirror 26b reflects the second split beam $B_3$ having traveled via the front mirror 26a, along a direction intersecting with the optical axis $L_1$ toward a light receiving surface of the rear dichroic mirror 25b. The correction lens 27 is arranged between the front mirror 26a and the rear mirror 26b and has a function to implement magnification correction and color correction for the second split beam $B_3$.

The imaging lens 13 is supported so that its optical axis $L_2$ is parallel to the optical axis $L_1$ and is configured so that the optical axis $L_2$ can be moved in a direction perpendicular to the optical axis $L_1$ while being kept in parallel with the optical axis $L_1$. The imaging lens 13 receives the first and second split beams $B_2$, $B_3$ split off from the observation light $B_1$ via the dichroic mirrors 25a, 25b and focuses those split beams $B_2$, $B_3$ to form separate first and second optical images on the imaging device 8 in a camera device 30 arranged outside. At this time, the inside diameter of the aperture stop 10, the angle and position of the rear dichroic mirror 25b or the rear mirror 26b, and the position of the imaging lens 13 are appropriately adjusted, whereby the first and second optical images can be made to be received in two divided regions on a light receiving surface of the imaging device 8. On the other hand, when the dichroic mirrors 25a, 25b are detached, the imaging lens 13 receives the observation light $B_1$ via the collimator lens 11 only and focuses the observation light $B_1$ to form a single optical image on the imaging device 8 in the camera device 30. At this time, the inside diameter of the aperture stop 10 and the position of the imaging lens 13 are appropriately adjusted, whereby the single optical image can be made to be received in a wider region of the entire light receiving surface of the imaging device 8.

The light splitting optical device 7 may be provided with a detection mechanism 14, such as a switch element or a sensor element, which detects attachment/detachment of the front dichroic mirror 25a and the rear dichroic mirror 25b and which outputs a detection signal thereof to the control unit 9. A wavelength filter such as a bandpass filter may be located on the optical paths of the first and second split beams $B_2$, $B_3$ split off from the observation light $B_1$ via the dichroic mirrors 25a, 25b.

The light splitting optical device 7 of the configuration as described above can be used in common to both of an observation mode to observe the observation light as a single optical image by the camera device 30 (which will be referred to hereinafter as "single view mode") and an observation mode to observe the observation light as two separate optical images by the camera device 30 (which will be referred to hereinafter as "double view mode").

Figure 3:
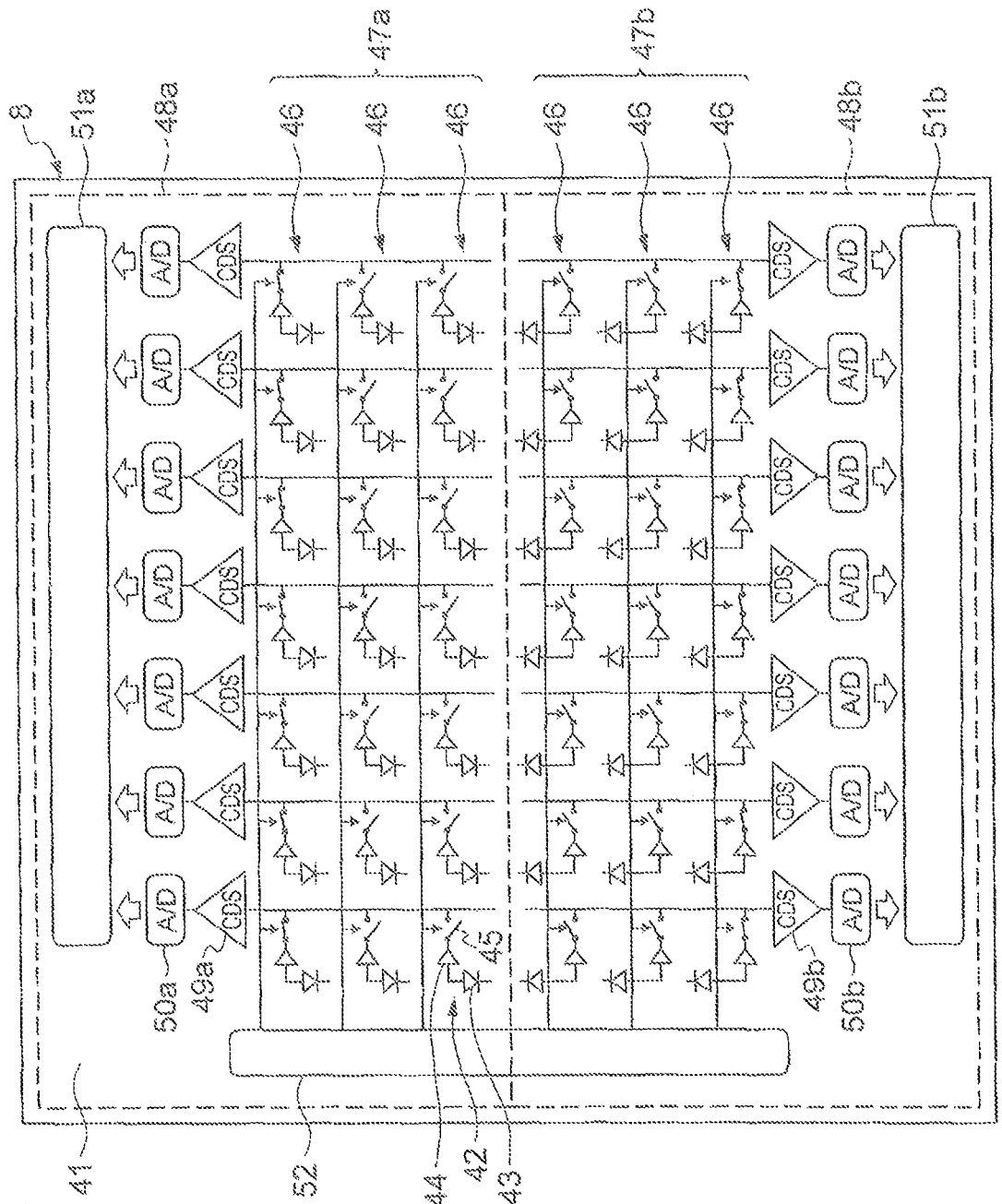
FIG. 3 is a block diagram showing a configuration of an imaging device 8 in FIG. 1.

The following will describe the detailed configuration of the imaging device 8, with reference to FIG. 3. As shown in the same figure, the imaging device 8 has a plurality of pixel circuits 42 arrayed in a two-dimensional pattern along its light receiving surface 41. This pixel circuit 42 is composed of a photodiode 43 for converting light into an electric charge, an amplifier 44 for converting the electric charge accumulated in the photodiode 43, into an electric signal, and a switch 45 for defining the readout timing of the electric signal to be output from the amplifier. The plurality of such pixel circuits 42 are arranged in a predetermined number at predetermined intervals in one direction (the horizontal direction in FIG. 3) along the light receiving surface 41 to constitute pixel rows 46. Furthermore, a plurality of pixel rows 46 are arranged in juxtaposition in a direction (the vertical direction in FIG. 3) perpendicular to the one direction along the light receiving surface 41 to constitute adjacent two pixel row groups 47a, 47b. Namely, the two pixel row groups 47a, 47b include the pixel rows 46 in respective regions 48a, 48b obtained by dividing the light receiving surface 41 into two by a central part, out of the plurality of pixel rows 46 arranged across the central part of the light receiving surface 41. The regions 48a, 48b of this light receiving surface 41 correspond to image formation positions of the first and second optical images, respectively, output from the light splitting optical device 7.

Furthermore, the imaging device 8 has separate circuit configurations capable of implementing rolling readout for the two pixel row groups 47a, 47b, respectively. Specifically, series circuits each of which includes a CDS amplifier 49a and an A/D converter 50a are connected to outputs of the amplifiers 44 of the respective pixel circuits 42 included in the region 48a and, these series circuits are provided as many as the number of pixel circuits 42 arranged in each pixel row 46, and are connected thereto in common along an array direction of the pixel rows 46 across the plurality of pixel rows 46 included in the pixel row group 47a. A common digital signal output circuit (signal readout circuit) 51a is connected to these series circuits. As configured in this manner, detection signals of the optical image detected by the pixel circuits 42 constituting the pixel rows 46 included in the pixel row group 47a are sequentially read out as digital signals in units of the respective pixel rows 46 by the digital signal output circuit 51a.

Similarly, series circuits each of which includes a CDS amplifier 49b and an A/D converter 50b are connected to outputs of the amplifiers 44 of the respective pixel circuits 42 included in the region 48b, and these series circuits are connected thereto in common along the array direction of the pixel rows 46 across the plurality of pixel rows 46 included in the pixel row group 47b. A common digital signal output circuit (signal readout circuit) 51b is connected to these series circuits. As configured in this manner, detection signals of the optical image detected by the pixel circuits 42 constituting the pixel rows 46 included in the pixel row group 47b are sequentially read out as digital signals in units of the respective pixel rows 46 by the digital signal output circuit 51b.

The imaging device 8 is further provided with a scan circuit 52 for defining exposure timings and signal readout timings in the pixel circuits 42. This scan circuit 52 defines the readout timing of the electric signals by the switches 45 of the pixel circuits 42, for each of the pixel rows 46. Namely, the scan circuit 52 defines the readout timing to implement so-called rolling readout in such a manner that the readout of the electric signals from the pixel circuits 42 is carried out in order in a predetermined direction along the light receiving surface 41 in units of the respective pixel rows 46. In this regard, the scan circuit 52 defines the readout timings so as to perform independent rolling readout in the pixel row group 47a included in the region 48a and in the pixel row group 47b included in the region 48b. Furthermore, the scan circuit 52 is configured so as to be able to set directions of the rolling readout along the light receiving surface 41, independently for the pixel row group 47a included in the region 48a and for the pixel row group 47b included in the region 48b, with reception of an instruction signal from the control unit 9.

Referring back to FIG. 1, the control unit 9 is connected to the imaging device 8 and generates an instruction signal to independently control the direction of the rolling readout from the pixel row group 47a in the imaging device 8 and the direction of the rolling readout from the pixel row group 47b in the imaging device 8. This control unit 9 may be a control device such as a computer terminal connected outside the camera device 30, or may be a control circuit mounted on the imaging device 8. Specifically, when the light splitting optical device 7 is set in the double view mode, i.e., when the light splitting optical system 12 (FIG. 2) including the front dichroic mirror 25a and the rear dichroic mirror 25b is arranged on the optical path of the observation light $B_1$, the control unit 9 performs the control as follows. Specifically, the control is performed in such a manner that the direction of the rolling readout in the pixel row group 47a and the method of the rolling readout in the pixel row group 47b are identical in the juxtaposition direction of the pixel rows 46. FIG. 4 is a drawing conceptually showing the directions of the rolling readout in the pixel row groups 47a, 47b on the light receiving surface 41 controlled by the control unit 9. In this way, the direction of the rolling readout in the pixel row group 47a is controlled to the direction (downward direction in FIG. 4) from the end of the region 48a opposite to the region 48b to the boundary between the region 48a and the region 48b, and the direction of the rolling readout in the pixel row group 47b is controlled to the direction (downward direction in FIG. 4) from the boundary between the region 48b and the region 48a to the end of the region 48b opposite to the region 48a.

When the light splitting optical device 7 is set in the single view mode, i.e., when the light splitting optical system 12 (FIG. 2) including the front dichroic mirror 25a and the rear dichroic mirror 25b is detached from on the optical path of the observation light $B_1$, the control unit 9 performs the control as follows. Specifically, the control is performed in such a manner that the direction of the rolling readout in the pixel row group 47a and the method of the rolling readout in the pixel row group 47b are opposite in the juxtaposition direction of the pixel rows 46. FIG. 5 is a drawing conceptually showing the directions of the rolling readout in the pixel row groups 47a, 47b on the light receiving surface 41 controlled by the control unit 9. In this way, the direction of the rolling readout in the pixel row group 47a is controlled to the direction (upward direction in FIG. 4) from the boundary between the region 48a and the region 48b to the end of the region 48a opposite to the region 48b, and the direction of the rolling readout in the pixel row group 47b is controlled to the direction (downward direction in FIG. 4) from the boundary between the region 48b and the region 48a to the end of the region 48b opposite to the region 48a.

In this regard, when the light splitting optical device 7 is provided with the detection mechanism for detecting attachment/detachment of the front dichroic mirror 25a and the rear dichroic mirror 25b, the control unit 9 may perform the control so as to switch the readout mode as follows. Namely, with detection of arrangement in which the light splitting optical system 12 including the front dichroic mirror 25a and the rear dichroic mirror 25b is arranged on the optical path, the control unit 9 perform the control so as to automatically switch the readout mode to the first readout mode in which the directions of the rolling readout in the pixel row groups 47a, 47b are identical as shown in FIG. 4. On the other hand, with detection of arrangement in which the light splitting optical system 12 is detached from on the optical path, the control unit 9 performs the control so as to automatically switch the readout mode to the second readout mode in which the directions of the rolling readout in the pixel row groups 47a, 47b are opposite as shown in FIG. 5. If the light splitting optical device 7 is not provided with the detection mechanism, the control unit 9 may be configured to switch the readout mode in accordance with observer's selection.

Next, a procedure of a light observation method according to the present embodiment with the use of the light observation device 1 will be described in detail. FIG. 6 is a flowchart showing the procedure of the light observation method.

With a start of the observation process, the observer first selects the observation mode, in order to determine the rolling readout directions (S0). Specifically, the observer selects the single view mode or the double view mode, using a selection screen displayed on a display part of the control unit 9. When the double view mode is selected, the observation light $B_1$ is split into the first split beam $B_2$ and the second split beam $B_3$ by the light splitting optical system 12 (S11). Thereafter, the first split beam $B_2$ and the second split beam $B_3$ are focused to form the first optical image corresponding to the first split beam $B_2$ and the second optical image corresponding to the second split beam $B_3$ (S21). The imaging device 8 is arranged so that the pixel row group 47a is located at the position where the first optical image is formed and so that the pixel row group 47b is located at the position where the second optical image is formed. In the case of the double view mode, the control unit selects the first readout mode in which the directions of the rolling readout in the pixel row group 47a and in the pixel row group 47b are identical, and the first optical image and the second optical image are captured in the first readout mode (S31). Based on image data obtained, a first image corresponding to the first optical image and a second image corresponding to the second optical image are created and displayed on the display part of the control unit 9 (S4).

On the other hand, when the single view mode is selected, the observation light $B_1$ is focused to form a optical image (S22). In the case of the single view mode, the control unit selects the second readout mode in which the directions of the rolling readout in the pixel row group 47a and in the pixel row group 47b are opposite, and the optical image is captured in the second readout mode (S32). Based on image data obtained by the capturing, an image corresponding to the optical image is created and displayed on the display part of the control unit 9 (S4).

According to the light observation device 1, the imaging device 8 used for the same, and the light observation method as described above, the light splitting optical system 12 splits the observation light of the observation object A into the first and second split beams, the first and second split beams thus split are focused by the imaging lens 13 to form the first and second optical images, the first optical image is received by the pixel row group 47a included in the region 48a of the imaging device 8, and the second optical image is received by the pixel row group 47b included in the region 48b of the imaging device 8. Then, under control of the control unit 9, detection signals of the first and second optical images are read out by independent rolling readout from the pixel row groups 47a, 47b, respectively, while the direction of the rolling readout in the pixel row group 47a and the direction of the rolling readout in the pixel row group 47b are made identical. This makes it easier to match the exposure timings at the same part of the observation object A between the detected image of the first optical image and the detected image of the second optical image, whereby the exposure conditions for each part of the two optical images can be made uniform. As a result, it can facilitate comparative observation using the detected images of the two optical images.

FIG. 7A conceptually shows the directions of the rolling readout on the light receiving surface 41 controlled by the control unit 9 in use in the double view mode and, in correspondence to it, FIG. 7B shows the exposure timings in the respective pixel rows 46 on the light receiving surface 41 in use in the double view mode. As shown in the same figure, the directions of the rolling readout in the region 48a and in the region 48b are set to be identical, whereby exposure durations $T_{A1}$ of the plurality of pixel rows 46 included in the region 48a are set as sequentially delayed each by a predetermined period from the end of the region 48a toward the central part of the light receiving surface 41 and whereby exposure durations $T_{B1}$ of the plurality of pixel rows 46 included in the region 48b are set as sequentially delayed each by a predetermined period from the central part of the light receiving surface 41 toward the end of the region 48b. As a result, the exposure durations $T_{A1}$, $T_{B1}$ of the pixel rows 46 corresponding to the same part of the detected images become easier to be matched between the regions 48a, 48b. This allows accurate comparison between the detected image of the first optical image and the detected image of the second optical image, in a situation where the observation object A is in motion, or in a situation where the observation light varies due to color fading of a fluorescence reagent or the like.

In the configuration herein, the control unit 9 is configured so as to be able to switch the readout mode between the first readout mode and the second readout mode. The digital signal output circuits 51a, 51b and the scan circuit 52 operate so as to select the readout mode from the first readout mode and the second readout mode, under control of the control unit 9. This allows the exposure conditions for each part of the two optical images in use in the double view mode to be made uniform. On the other hand, in use in the single view mode, a linear contrast difference can be prevented from appearing in a detected image of a single optical image. As a result, observation of optical image can be implemented with high accuracy, even in the case where the device is in common use in the single view mode and the double view mode.

FIG. 8A conceptually shows the directions of the rolling readout on the light receiving surface 41 controlled by the control unit 9 in use in the single view mode and, in correspondence to it, FIG. 8B shows the exposure timings in the respective pixel rows 46 on the light receiving surface 41 in use in the single view mode. As shown in the same figure, the directions of the rolling readout in the region 48a and in the region 48b are set to be opposite, whereby exposure durations $T_{A2}$ of the plurality of pixel rows 46 included in the region 48a are set as sequentially delayed each by a predetermined period from the central part of the light receiving surface 41 toward the end of the region 48a and whereby exposure durations $T_{B2}$ of the plurality of pixel rows 46 included in the region 48b are set as sequentially delayed each by a predetermined period from the central part of the light receiving surface 41 toward the end of the region 48b. As a result, the exposure durations $T_{A2}$, $T_{B2}$ of the pixel rows 46 adjacent in the central part of the detected image become easier to be matched between the regions 48a, 48b. This can prevent a linear contrast difference from appearing at the boundary between the region 48a and the region 48b in the detected image of the single optical image.

In contrast to it, FIGS. 12A and 12B show the exposure timings in the respective pixel rows 46 on the light receiving surface 41 in a case of setting where the device in use in the single view mode is set in the first readout mode in which the directions of the rolling readout in the pixel row groups 47a, 47b are identical. With this setting, exposure durations $T_{A3}$, $T_{B3}$ of the adjacent two pixel rows 46 corresponding to the central part of the detected image become unmatched between the regions 48a, 48b, and it is thus unfavorable. In this case, a linear contrast difference becomes more likely to appear at the boundary between the region 48a and the region 48b in the detected image of the single optical image.

Figure 13A:
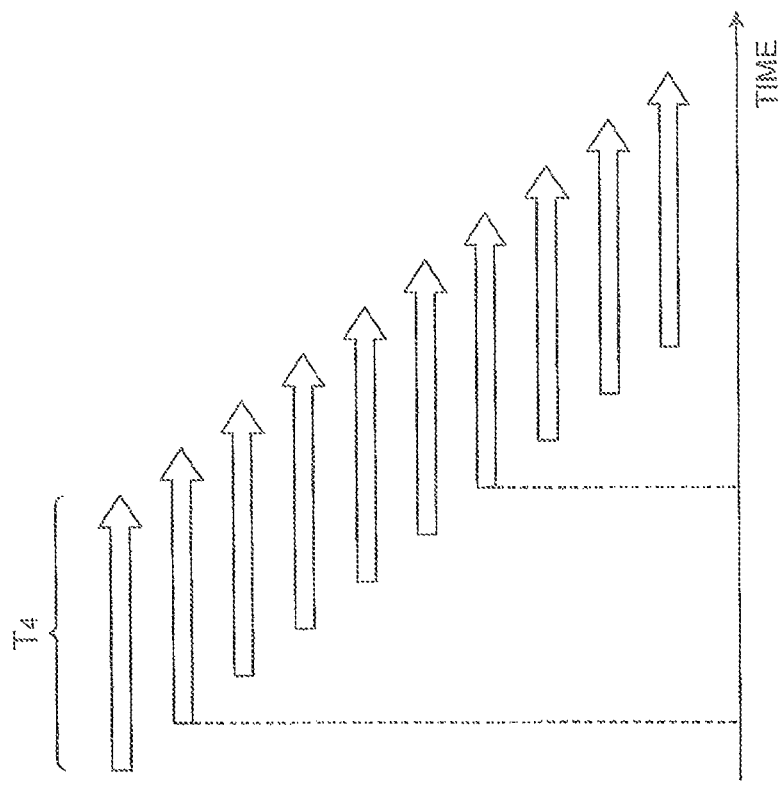
FIG. 13A is a drawing conceptually showing directions of rolling readout on the light receiving surface 41 in a conventional example, and FIG. 13B a drawing showing exposure timings in the respective pixel rows 46 on the light receiving surface 41 corresponding to the foregoing control.
Figure 13B:
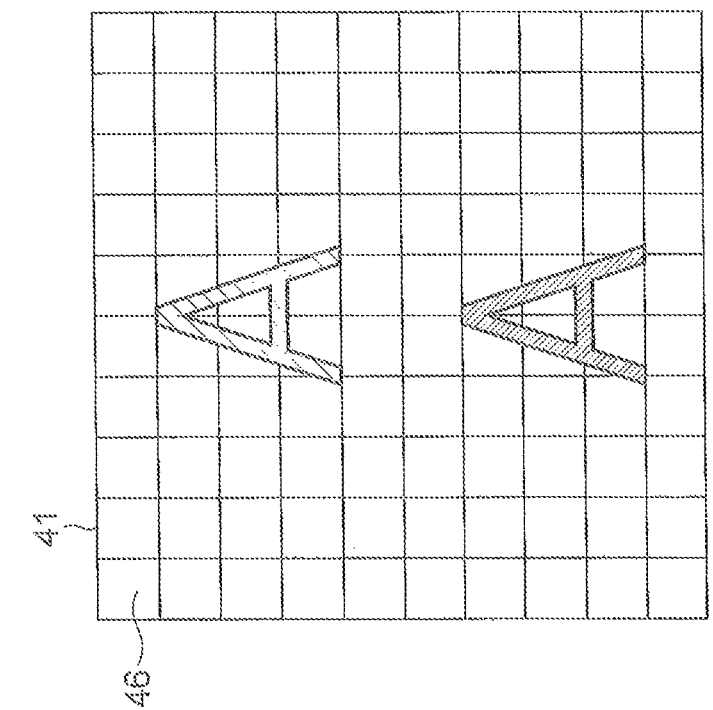

Furthermore, FIGS. 13A and 13B show the exposure timings in the respective pixel rows 46 on the light receiving surface 41 in a case using the imaging device of the conventional rolling readout method. In this case, the rolling readout is executed in one direction over the entire light receiving surface 41, whereby exposure durations $T_4$ of the plurality of pixel rows 46 are set so as to be sequentially delayed each by a predetermined period from one end to the other end of the light receiving surface 41. As a result, when it is used in the double view mode, the exposure durations $T_4$ of the pixel rows 46 corresponding to the same part of the two detected images tend to be unmatched. Because of this, the exposure conditions for the detected image of the first optical image and for the detected image of the second optical image become different in the situation where the observation object A is in motion or in the situation where the observation light varies due to color fading of a fluorescence reagent or the like, so as to result in failure in accurate comparison between them.

Figure 14B:
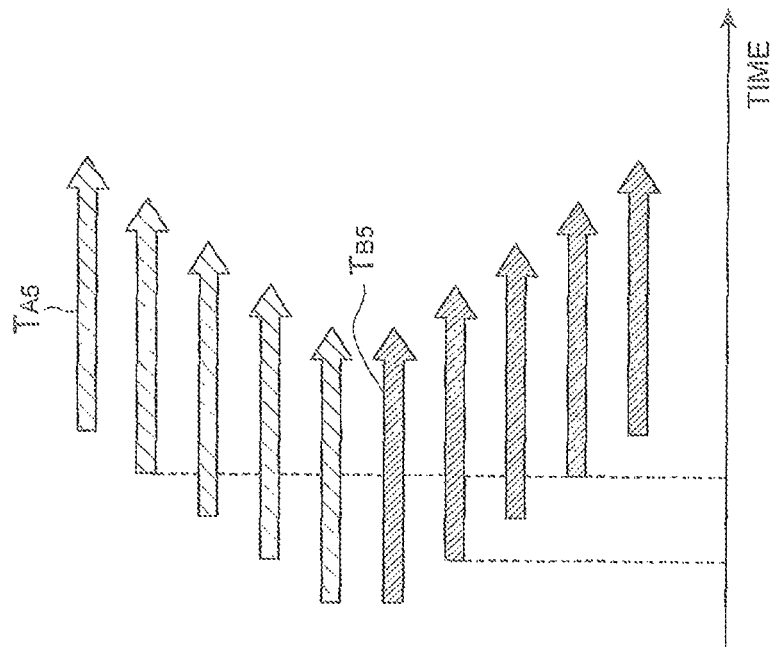
FIG. 14A is a drawing conceptually showing directions of rolling readout on the light receiving surface 41 in a comparative example, and FIG. 14B a drawing showing exposure timings in the respective pixel rows 46 on the light receiving surface 41 corresponding to the foregoing control.
Figure 14A:
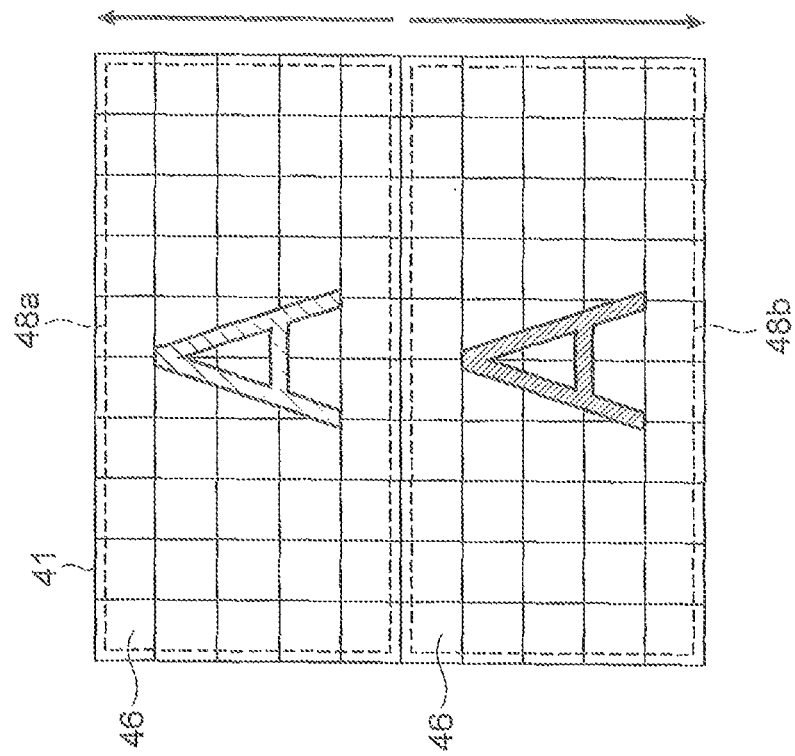

FIGS. 14A and 14B show the exposure timings in the respective pixel rows 46 on the light receiving surface 41 in a case of setting where the device in use in the double view mode is set in the second readout mode. In this case, exposure durations $T_{A5}$, $T_{B5}$ of the adjacent two pixel rows 46 corresponding to the same part of the detected images become unmatched between the regions 48a, 48b. This makes the exposure conditions different between the detected image of the first optical image and the detected image of the second optical image, so as to result in failure in accurate comparison between them.

It should be noted that the present invention is by no means intended to be limited only to the above-described embodiment.

For example, the first and second readout modes set by the control unit 9 of the light observation device 1 can be modified as described below.

Figure 10:
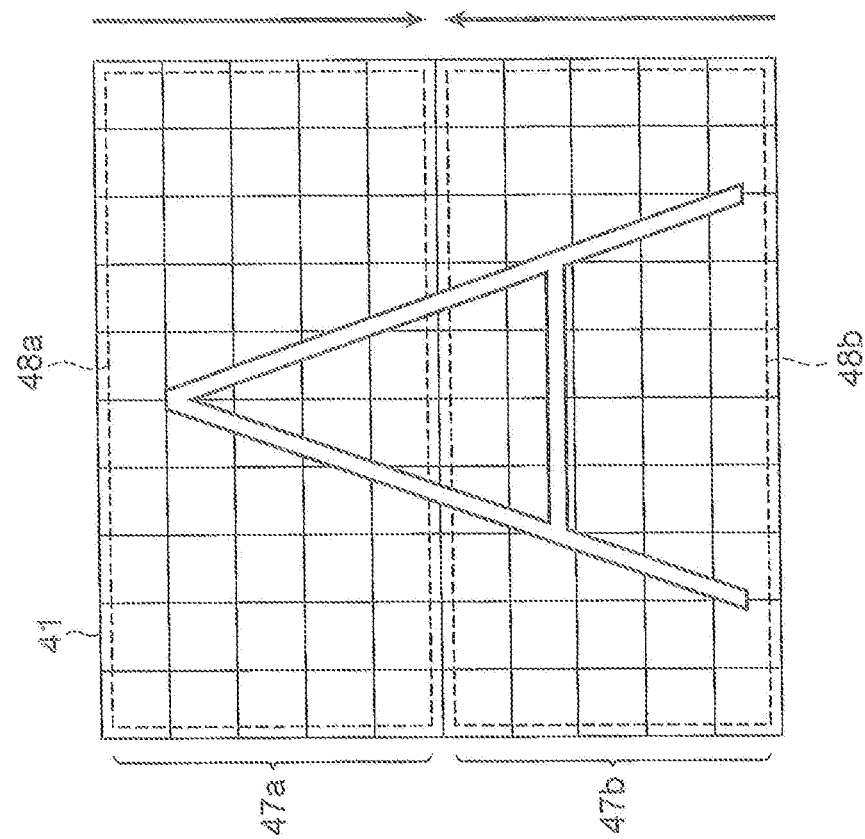
FIG. 10 is a drawing conceptually showing directions of rolling readout in the pixel row groups 47a, 47b on the light receiving surface 41 controlled by the control unit 9 according to the modification example of the present invention.

FIG. 9 and FIG. 10 are drawings conceptually showing the directions of the rolling readout in the pixel row groups 47a, 47b on the light receiving surface 41 controlled by the control unit 9 according to a modification example of the present invention. As shown in FIG. 9, in use in the double view mode, the directions of the rolling readout in the pixel row groups 47a. 47b both may be set to the opposite directions to the directions shown in FIG. 4. Furthermore, in use in the single view mode, as shown in FIG. 10, the directions of the rolling readout in the pixel row groups 47a, 47b both may be set to the opposite directions to the directions shown in FIG. 5.

The control unit 9 may be configured so as to allow the exposure times to be made independently variable for the respective pixel row groups 47a, 47b, or may be configured so as to be able to control the exposure times to different times for the respective pixel row groups 47a, 47b. FIGS. 11A and 11B shows show the exposure timings in the respective pixel rows 46 on the light receiving surface 41 in a modification example of the present invention. As shown in the same figure, the control unit 9 can control the directions of the rolling readout for the respective pixel row groups 47a, 47b and can set lengths of the exposure durations $T_{A6}$, $T_{B6}$ of the respective pixel row groups 47a, 47b to different times. In this case, the start timing of signal readout of each pixel row 46 is set immediately after the exposure duration $T_{A6}$, $T_{B6}$ of each pixel row and the start timings of signal readout are controlled so as to be synchronized between the regions 48a, 48b. Namely, the timings of signal readout of the two pixel rows 46 in the regions 48a, 48b corresponding to the same part of the detected images are controlled so as to be synchronized with each other.

In imaging of the observation light in the conventional double view mode, the optical images in different wavelength regions are individually captured and if the light intensities of the respective optical images are significantly different, the light is made to pass through a neutral density filter or the like so as to approximately equalize the light intensities. In the present embodiment shown in FIGS. 11A and 11B, the exposure times can be set independently between the two optical images and, thus, the exposure time for one optical image with the larger light intensity can be set shorter than that for the other, whereby the light intensities detected as detected images can be approximately equalized without use of the neutral density filter. Furthermore, by synchronizing the timings of signal readout of the two pixel rows 46 in the two regions 48a, 48b, the exposure timings can be surely matched for the same part of the observation object between the detected images of the two optical images, whereby the exposure conditions for the same part of the two optical images can be made more uniform.

The configuration of the light splitting optical device 7 forming the light observation device 1 is not limited only to the configuration shown in FIG. 2, but it may be configured using the conventional configurations such as the light splitting optical systems described in the U.S. Pat. Nos. 5,926,283 and 7,667,761 and the optical system described in Literature "K. Kinosita, Jr. et al., "Dual View Microscopy with a Single Camera: Real-Time Imaging of Molecular Orientations and Calcium," The Journal of Cell Biology, Volume 115, Number 1, October 1991, pp 67-73." Furthermore, the light splitting optical system 12 is not limited only to the configuration including the dichroic mirrors.

It is preferred herein that in the above-described light observation device, the control unit perform the control so as to allow switching between: a first readout mode in which the direction of the rolling readout in the first pixel row group and the direction of the rolling readout in the second pixel row group are identical in the juxtaposition direction of the plurality of pixel rows; and a second readout mode in which the direction of the rolling readout in the first pixel row group and the direction of the rolling readout in the second pixel row group are opposite in the juxtaposition direction of the plurality of pixel rows. Furthermore, it is preferred that in the above-described light observation method, selection be implemented between: a first readout mode in which the direction of the rolling readout in the first pixel row group and the direction of the rolling readout in the second pixel row group are identical in the juxtaposition direction of the plurality of pixel rows; and a second readout mode in which the direction of the rolling readout in the first pixel row group and the direction of the rolling readout in the second pixel row group are opposite in the juxtaposition direction of the plurality of pixel rows. By adopting such a configuration, the readout mode is switched to the first readout mode in simultaneous imaging of the two optical images by the imaging element, whereby the exposure conditions for each part of the two optical images can be made uniform. On the other hand, the readout mode is switched to the second readout mode in imaging of the single optical image by the imaging element, whereby a linear contrast difference can be prevented from appearing in the detected image of the single optical image. As a result, it becomes feasible to implement high-accuracy observation of optical image, even in the case where the device is used in common in the observation mode to image the two optical images and in the observation mode to image the single optical image.

Furthermore, it is also preferred that the light splitting optical system be configured so as to be detachable from on an optical path of the observation light and that the control unit perform the control so as to switch to the first readout mode when the light splitting optical system is arranged on the optical path and to switch to the second readout mode when the light splitting optical system is detached from on the optical path. In this case, since the control is performed so as to switch between the first and second readout modes in accordance with attachment/detachment of the light splitting optical system, high-accuracy observation of optical image is facilitated in the case where the device is used in common in the observation mode to image the two optical images and in the observation mode to image the single optical image.

Furthermore, it is also preferred that the control unit perform the control so as to allow each of an exposure time of the rolling readout in the first pixel row group and an exposure time of the rolling readout in the second pixel row group to be made variable. This allows the sensitivity in imaging of the first optical image and the sensitivity in imaging of the second optical image to be freely set, so as to enhance degrees of freedom of the imaging conditions for the two optical images.

Yet furthermore, it is also preferred that the control unit perform the control so as to set an exposure time of the rolling readout in the first pixel row group and an exposure time of the rolling readout in the second pixel row group to different times. This allows the sensitivity in imaging of the first optical image and the sensitivity in imaging of the second optical image to be set to be different, so as to enhance degrees of freedom of the imaging conditions for the two optical images.

Still furthermore, it is also preferred that the control unit perform the control so as to synchronize a start timing of the rolling readout in the first pixel row group with a start timing of the rolling readout in the second pixel row group. This configuration allows the exposure timings at the same part of the object to be surely matched between the detected image of the first optical image and the detected image of the second optical image, so as to further uniformize the exposure conditions for each part of the two optical images.

It is also preferred herein that in the foregoing imaging device, the first and second signal readout circuits implement switching between: a first readout mode in which the direction of the rolling readout in the first pixel row group and the direction of the rolling readout in the second pixel row group are identical in the juxtaposition direction of the plurality of pixel rows; and a second readout mode in which the direction of the rolling readout in the first pixel row group and the direction of the rolling readout in the second pixel row group are opposite in the juxtaposition direction of the plurality of pixel rows. By adopting such a configuration, the readout mode is switched to the first readout mode in simultaneous imaging of the two optical images by the imaging element, whereby the exposure conditions for each part of the two optical images can be made uniform. On the other hand, the readout mode is switched to the second readout mode in imaging of the single optical image by the imaging element, whereby a linear contrast difference can be prevented from appearing in the detected image of the single optical image. As a result, it becomes feasible to implement high-accuracy observation of optical image, even in the case where the device is used in common in the observation mode to image the two optical images and in the observation mode to image the single optical image.

INDUSTRIAL APPLICABILITY

The present invention is applied to usage as the light observation device for observing the optical image of the object, the imaging device used for the same, and the light observation method and facilities the comparative observation between two types of optical images of the object even in the case adopting the rolling readout method.

REFERENCE SIGNS LIST

1 light observation device; 7 light splitting optical device; 8 imaging device; 9 control unit; 12 light splitting optical system; 13 imaging lens; 42 pixel circuit; 46 each pixel row; 47a first pixel row group; 47b second pixel row group; 48a first region; 48b second region; 51a digital signal output circuit (first signal readout circuit); 51b digital signal output circuit (second signal readout circuit); A observation object; $B_1$ observation light; $B_2$ first split beam; $B_3$ second split beam.

The invention claimed is:

1. A method for capturing observation image using an imaging device which has a first pixel row group configured with a plurality of pixel rows, and a second pixel row group adjoining the first pixel row group and configured with a plurality of pixel rows, the first pixel row group and the second pixel row group respectively arranged in two adjacent divided regions of a light receiving surface of the imaging device, the method comprising:
   separating an observation image into a first optical image and a second optical image;
   setting lengths of exposure durations of the first pixel row group and the second pixel row group to different times from each other;
   controlling rolling readout in the first pixel row group to capture the first optical image;
   controlling rolling readout in the second pixel row group independently from the rolling readout in the first pixel row group to capture the second optical image, wherein a first direction of the rolling readout in the first pixel row group and a second direction of the rolling readout in the second pixel row group are identical; and
   controlling timings of signal readout of each pixel row after the exposure duration of each pixel row in the first pixel row group and the second pixel row group so as to be synchronized with each other.

2. The method according to claim 1, further comprising setting a beam splitter to separate the observation image.

3. The method according to claim 1, further comprising independently setting each of an exposure time of the rolling readout in the first pixel row group and an exposure time of the rolling readout in the second pixel row group.

4. A method for capturing observation image using an imaging device which has a first pixel row group configured with a plurality of pixel rows, and a second pixel row group adjoining the first pixel row group and configured with a plurality of pixel rows, the first pixel row group and the second pixel row group respectively arranged in two adjacent divided regions of a light receiving surface of the imaging device, the method comprising:

focusing observation light on the first pixel row group and the second pixel row group to form an observation image;

setting lengths of exposure durations of the first pixel row group and the second pixel row group to different times from each other;

controlling rolling readout in the first pixel row group to capture a portion of the observation image;

controlling rolling readout in the second pixel row group independently from the rolling readout in the first pixel row group to capture another portion of the observation image, wherein a first direction of the rolling readout in the first pixel row group and a second direction of the rolling readout in the second pixel row group are opposite; and controlling timings of signal readout of each pixel row after the exposure duration of each pixel row in the first pixel row group and the second pixel row group so as to be synchronized with each other.

5. The method according to claim 4, further comprising independently setting each of an exposure time of the rolling readout in the first pixel row group and an exposure time of the rolling readout in the second pixel row group.

* * * * *